E. W. MANTON.
MACHINE FOR REBATING AND RECESSING AND CHAMFERING SQUARE OR ANGULAR CORNERS.
APPLICATION FILED JAN. 30, 1919.

1,298,531.

Patented Mar. 25, 1919.

Inventor

Edwin William Manton by his Attorney

UNITED STATES PATENT OFFICE.

EDWIN WILLIAM MANTON, OF PORT BROUGHTON, SOUTH AUSTRALIA, AUSTRALIA, ASSIGNOR TO CLARENCE JAMES WATERS, OF PORT BROUGHTON, SOUTH AUSTRALIA, AUSTRALIA.

MACHINE FOR RABBETING AND RECESSING AND CHAMFERING SQUARE OR ANGULAR CORNERS.

1,298,531.	Specification of Letters Patent.	Patented Mar. 25, 1919.

Application filed January 30, 1919. Serial No. 274,104.

*To all whom it may concern:*

Be it known that EDWIN WILLIAM MANTON, citizen of the Commonwealth of Australia, residing at McKay street, Port Broughton, in the State of South Australia, Commonwealth of Australia, cabinet-maker, has invented certain new and useful Improvements in an Improved Machine for Rabbeting and Recessing and Chamfering Square or Angular Corners, of which the following is a specification.

This invention relates to an improved machine for rabbeting and recessing and chamfering square or angular corners the object of the same being to provide means whereby work of the nature above indicated may be carried into complete effect without necessitating the introduction of additional tools.

Machines at present in use for rabbeting and recessing usually leave a rounded-off portion where an actual angle or corner is intended to be cut but with this appliance a finished corner is accurately made.

In carrying my invention into effect I provide a rotating and pointed cutter which is mounted in a machine frame in such a manner that the upper cutting surface of the tool lies parallel with the top of the machine table thus enabling the pointed portion to completely achieve its object with the aid of a guide or gate.

Figures 1, 2:
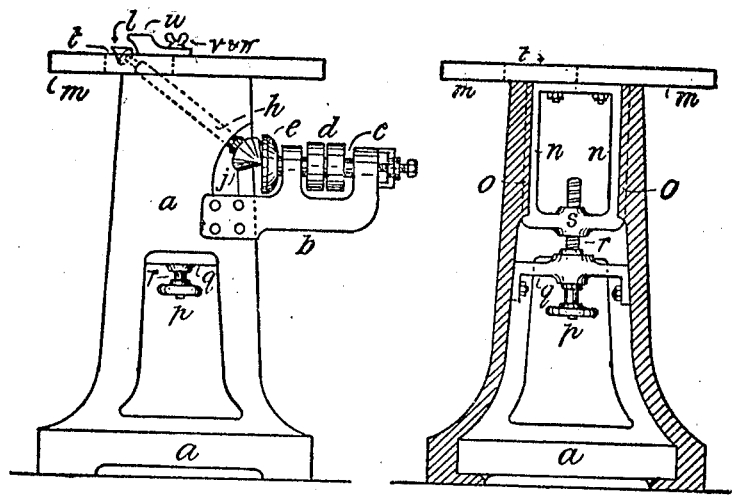

I will now describe the invention by aid of the accompanying illustrative drawings wherein, Figure 1 is a front elevation of the machine.

Fig. 2 section of machine illustrating adjustment for table but omitting tool and bearing.

Figures 3, 4, 5:
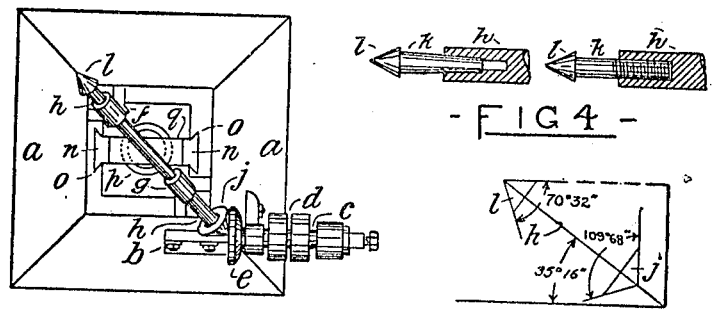

Fig. 3 is a plan of same with top of table removed.

Fig. 4 alternative methods of mounting the cutting tools in rotating spindle.

Fig. 5 outline plan showing relative position of constructional angles of spindle on cutting tool.

In each of the illustrations similar letters of reference are used to denote similar or corresponding parts wherever they occur.

In the drawings $a$ is the main structure or body of the machine stand and is preferably of cast metal. This structure is provided with a side bracket $b$ which carries the driving shaft $c$ and belt pulleys $d$, and if the machine is to be used in connection with the manufacture of woodwork a friction drive wheel is furnished at $e$ on the inner end of the shaft, but toothed gearing may be used for ironwork. A recess may be formed in the corner or angle of the casting adjacent to the friction drive wheel as shown.

In the interior of the main standard, bearings are arranged at opposite corners as indicated at $f$ and $g$ for the accommodation and support of a rotary tool spindle $h$, said bearings being rendered adjustable and furnished with means for lubrication in any manner which may be necessary.

The tool spindle is accommodated within its bearings at an angle equal to 35 16″ from the horizontal and at its lower end terminates with a metal cone indicated at $j$, but if the machine is intended to operate for cutting metal both this cone and the friction drive wheel $e$ previously mentioned will be replaced by toothed gear wheels.

The upper end of the rotary tool spindle is formed as a socket for the cutting tool and is either screw threaded for a left hand screw or is made in the form of a wedge or cone shaped socket as indicated in Fig. 4 into which shank $k$ of the cutting tool is introduced and secured. The cutting tool itself if required for forming a right angled corner is so sharpened that its upper edge or cutting head $l$ is in true parallel alinement with the surface of the adjustable table top $m$, this angle being equal to the angle which is formed from the opposite points or angles of a cube, being a cone of 70 32″.

The table top is supported by vertical slide plates $n$ which operate within grooves $o$, Figs. 2 and 3, and is operated by an adjustment wheel $p$ which takes its support from a cross plate $q$ being furnished with a spindle $r$, the upper end of which is screw threaded and operates upon a corresponding screw threaded portion $s$ forming a nut which joins the vertical slide pieces $n$ previously mentioned and enables the table to be raised or lowered and correspondingly adjusts the effective operation of the cutting tool.

An opening or recess $t$ is formed in the table top through which the end of the cutting tool protrudes and an adjustable fence, as shown at $u$, is provided for the guidance of the work, the position of the fence being readily altered for guide purposes by means of the slot $v$ and wing nut $w$ which secures the fence when adjusted by means of the clamp screw, as will be well understood.

I attach great importance to the angle at which the spindle is set and also to the angle of the cutting tool, the former being equal to that of a line drawn from the extreme opposite corners of a cube as previously indicated, the slope of the cone of the cutting tool (which may be an ordinary rose shaped cutter or other form of corrugated cone) being based on the complementary angle which the spindle makes with the horizontal table top being a complete cone of 70 32″, while that of the driving cone is based upon the angle obtained from projecting a vertical line from the axis of the spindle resulting in a cone of a 109 68″ as shown in Fig. 5 of the drawings.

A more acute angle can be obtained in rabbeting work by sharpening the cutting tool to a correspondingly finer angle. Such tool would be useful in rabbeting recesses or corners for a Gothic arch in decorative construction.

Having thus described my invention what I claim is:—

1. In an improved machine for rabbeting and recessing and chamfering square or angular corners a machine stand having bearings arranged at opposite corners for the accommodation of a rotary tool spindle such bearings characterized by being set to accommodate the spindle at an angle formed by drawing a line from extreme opposite corners of a cube being an angle of 35 16″ from the horizontal.

2. In an improved machine for rabbeting and recessing and chamfering square or angular corners comprising a spindle set at an angle of 35 16″, the combination therewith of a cone shaped cutting tool the top of such tool being parallel with the horizontal table top, the cone formation comprising an angle of 70 32″, and means for securing the tool within its spindle, and a driving cone or wheel having a contained angle of 109 68″ from a horizontal line adjacent to the opposite end of the spindle substantially as described and as illustrated.

3. In an improved machine for rabbeting and recessing and chamfering square or angular corners comprising the parts set forth and claimed in claim 1 the combination therewith of driving mechanism and pulley wheels for imparting rotary motion to the tool spindle.

4. In an improved machine for rabbeting and recessing and chamfering square or angular corners comprising the parts set forth and claimed in claim 1, the combination therewith of a vertically adjustable table top.

5. In an improved machine for rabbeting and recessing and chamfering square or angular corners comprising the parts set forth and claimed in claim 3, the combination therewith of an adjustable fence for guiding the work.

In testimony whereof I affix my signature in presence of two witnesses.

EDWIN WILLIAM MANTON.

Witnesses:
JOHN HUBER COOKE,
KATHLEEN CONSTANCE YEATES.

Copies of this patent may be obtained for five cents each, by addressing the "Commissioner of Patents, Washington, D. C."